United States Patent Office 2,770,772
Patented Nov. 13, 1956

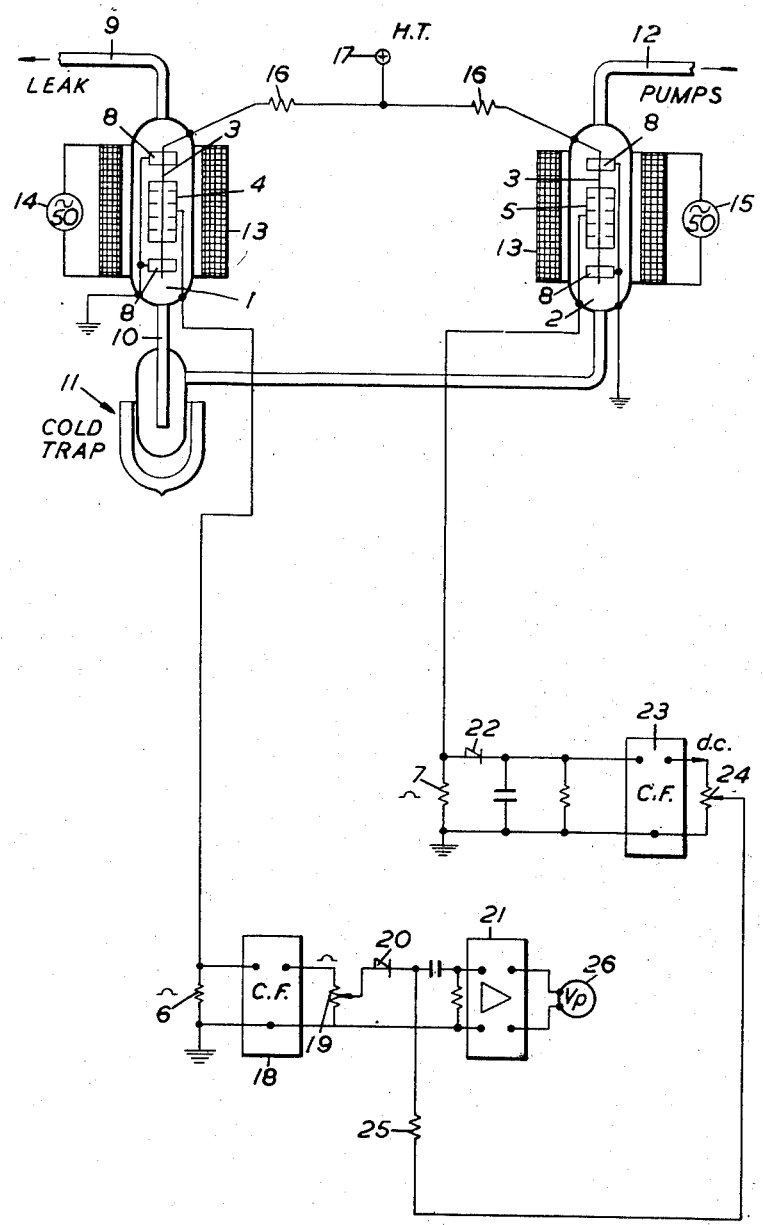

2,770,772
DETECTION OF LEAKS IN VACUUM APPARATUS

Christopher Henry Foulkes and Ernest James Blythe, London, England, assignors to International Standard Electric Corporation, New York, N. Y.

Application July 23, 1953, Serial No. 369,806

Claims priority, application Great Britain July 29, 1952

1 Claim. (Cl. 324—33)

The present invention relates to a method and apparatus for measurement and/or detection of leaks in vacuum systems such as are liable to be found in envelopes of thermionic valves.

A method which has become very popular in recent years for the detection of leaks in vacuum systems consists in connecting the system to a device such as a mass spectrograph, and searching for the leak or leaks with the aid of a fine jet of helium or other gas not normally present in the system. Should the jet fall on a leak, helium enters the system and is detected by the mass spectrograph. Mass spectrographs however are bulky and expensive pieces of apparatus, while helium is also expensive and difficult to obtain. An alternative method based upon the principle of differentiation between air and the probe gas has been developed using ordinary ionisation gauges. Thus in one known system a pair of ionisation gauges is connected to the system under test, one gauge being coupled directly to the system while the other is connected to the system through a filter which will absorb the probe gas to be used. A probe gas having a large collision cross section, thus causing appreciable ionisation in an ionisation manometer tube, is used. In one such system carbon dioxide is the probe gas and a suitable absorption filter is placed in series with the gas input to one of the gauges. In others, butane is used and a liquid air trap serves as filter, the butane being liquified in passage through the trap. The output circuits of the two gauges are connected in a bridge circuit, for example, and the outputs are compared. In the presence of a leak through which ordinary air is entering, both gauges will behave similarly and their outputs are arranged to cancel one another. On the other hand, when a probe gas is used the probe gas entering a leak affects the two gauges differently, since it replaces, to some extent, the air previously entering; consequently the output of the gauge connected to the system via the filter is decreased, while the other one will normally increase if a probe gas having a large collision cross-section is used as suggested above.

Of the many types of gauges that could be used in a differential leak detection system such as described above, the present applicants prefer to use a magnetron type of gauge, in which a cold cathode and anode are used to produce a discharge in the presence of gas molecules under the influence of crossed electric and magnetic fields. Any electrons present between the anode and cathode electrodes tend to execute spiral paths so that an electron has a very long path in which to encounter a gas molecule. When collisions occur positive ions accelerated to the cathode cause more electrons to be emitted and the familar Townsend avalanche discharge occurs. Apart from its sensitivity, the use of a magnetron type of ionisation gauge enables us to overcome any difficulties in the detecting circuit.

In the straightforward ionisation manometer system some form of bridge circuit is used and the provision of D. C. amplifiers is needed to detect the out of balance bridge current. In our co-pending application U. S. Serial No. 370,550, filed July 27, 1953, a differential ionisation manometer leak detection system is proposed, in which alternating magnetic field is superimposed upon a D. C. magnetron energising field, so that an alternating current output is obtained. The present applicants have found that it is satisfactory to dispense entirely with a steady magnetic field, and to use only an alternating one, in which case, however, the output approximating to half sine waves, from the two gauges is not necessarily of the same wave form.

A bridge method, therefore, involves difficulties due to the filtering out of unbalanced harmonics resulting from the difference of bridge input wave form. On the other hand, since the output of the gauges is in the form of pulses, these may readily be compared by known pulse methods.

According to one aspect of the present invention therefore, there is provided apparatus for the measurement and/or detection of leaks in a vacuum system comprising a pair of cold cathode magnetron ionisation gauges, one connected directly to the system under test and the other connected to the system via a filter, such as a liquid air cold trap, for probe gas used in searching for a leak, means for setting up an alternating magnetic field axially as the cathode in each gauge, and means for comparing the pulse output of the two gauges.

The invention will be more fully described with reference to the accompanying drawing which shows schematically the essential apparatus and circuit for carrying out the invention.

Although the present invention is applicable to other types of ionisation manometer gauges, we prefer to use a gauge of the kind described and claimed in U. S. Application No. 278,466, filed March 25, 1952. A preferred form of this gauge described and claimed in our co-pending application, U. S. Serial No. 370,550, comprises an anode wire surrounded by a cylindrical cathode from which it is supported by insulating means, the cathode enclosure being divided into a number of intercommunicating compartments by means of centrally apertured transverse baffles, through which the anode wire protrudes. The projecting baffles provide sources of field emission of electrons from the cathode and, furthermore, under the influence of crossed electric and magnetic fields, in the absence of ionisable gasses the electrons tend to travel axially towards planes intermediate between the baffles, so that there is very little chance of gas molecules passing these planes without being subject to ionising collisions.

In order to counteract the effect of leakage across the insulators between anode and cathode it is preferred to interpose guard electrodes between two insulating portions in series with one another, so that leakage current may be intercepted by the guard electrode and by-passed the measuring equipment. In the drawing, two such gauges, are indicated at 1 and 2. Reference numerals 3 indicate the central anode wire of each gauge, and 4 and 5 indicate the surrounding cathodes together with their associated baffles. The cathodes are shown connected to ground through respective resistors 6 and 7. The guard electrodes mentioned above are indicated at 8 and are connected to ground. The envelopes of the tubes are provided with tubulations at either end. Tube 1 is directly connected to system under test by the pipe line 9 and feeds through tubulation 10 into the gauge 2 through a cold trap 11 of conventional type, filled with liquid air. The other end of the ionisation gauge 2 is connected through the pipe 12 to vacuum pumps. We prefer to use a cold-trapped silicon oil diffusion pump, together with a backing pump, the combination being capable of removing several litres of gas per second at pressures of the order of $10^{-5}$ mm. Hg. It will be seen that, so far as the vacuum system is concerned, the two gauges are in series with the cold trap in between, so that if butane for example, is used as the probe gas, the butane passes through the tube 1 and is liquified in the cold trap, so that no butane reaches gauge 2. If butane is used, precautions should be taken that it is not absorbed before it enters the first gauge; for this reason waxes, oils and greases must be avoided at the first part of the vacuum system, and any joints should be made by glass working.

In the drawing the gauges 1 and 2 are shown surrounded by solenoids 13, energised from respective 50 cycle A. C. sources 14 and 15. The anodes of the ionisation gauges are connected via current limiting resistors 15 to terminal 17 connected to a source of high potential of the order of 5 kilovolts.

In operation, approximately half wavesine voltages are obtained across resistors 6 and 7 from the two gauges. The voltage across resistor 6 is fed via a cathode follower 18 and potentiometer 19 to a rectifier 20 in series with the input of an amplifier 21. The voltage from across the resistor 7, being the output of gauge 2, is rectified by the rectifier 22 and applied to the cathode follower 23, which feeds a potentiometer 24. The load resistor 25 of the rectifier 22 is connected to the slider of potentiometer 24, so that, if the outputs of the two gauges are the same, the rectifier 20 tends to be biased off and there is no input to the amplifier 21. When a probe gas enters the vacuum system through a leak, it displaces the air entering the system through that leak, and is liquified in the cold trap 11, so that the flow of gas to gauge 2 is reduced and the output therefore falls. At the same time the presence of the probe gas in gauge 1 increases the ionisation therein because of a large collision cross-sections of the probe gas molecules, and the output of the gauge 1 increases; thus the bias voltage across potentiometer 24 falls, while the voltage across potentiometer 19 rises, so that the peaks of the pulses from gauge 1 are passed to the amplifier 21, the output of which feeds a peak volt meter 26. The rectified input to the cathode follower 23 does not quite equal the peak voltage appearing across resistor 7, so that, even if the two gauges are working under the same conditions, some adjustment of the potentiometers 19 and 24 is necessary to obtain balance.

In preferred embodiments of the invention, the gauges 1 and 2 have an effective cathode length of 3 inches with baffles spaced ¾ inch apart. The inside diameter of cathode cylinder is ¾ inch and the baffle plates have ¾ of an inch diameter central apertures. The anode wire is tungsten of 0.002 inch diameter.

The solenoids 13 may be such that when fed from a 250 volt D. C. supply, a magnetic field corresponding to some 4,000 ampere turns is obtained. For use in the present invention, 250 volts, 50 cycles A. C. is substituted for the D. C. energisation. Applicants have found satisfactory solenoids approximately 4 inches long each carrying about 8,000 turns of 24 gauge wire, the solenoids being energised preferably from individual adjustable supplies giving a maximum pressure of 250 volts at 50 cycles. An H. T. supply of some $3{-}5$ kv. is required, the anode resistors 15 being 5 M$\omega$ and the load resistors each 1 M$\omega$. For the cathode followers, the two halves of a 6.SN7 double triode valve are suitable the potentiometers 19 and 24 being each 50,000 ohms. For the diodes, the two halves of a 6H6 valve have proved suitable. The load resistor for the rectifier 22 should be 10 M$\omega$ with a 0.1 $\mu$f. charging capacity. The cathode load 25 of rectifier 20 may be made 1 M$\omega$ and the input of amplifier 21 may be some 500,000 ohms fed through a 0.1 $\mu$f. capacitor. Using a single stage pentode tube for the amplifier 21 and, for the meter 26, a cathode ray tube or a valve volt-meter arranged to measure negative peak voltages, reliable indications can be obtained with leaks of the order of $10^{-5}$ micron litres per second. A leak of this size gives a deflection on the valve-volt-meter of the order of 100 volts. The ultimate sensitivity of the arrangement is not yet known but compares very favourably with the much more expensive and elaborate mass spectrometer.

While the principles of the invention have been described above in connection with specific embodiments, and particular modifications thereof, it is to be clearly understood that this description is made only by way of example and not a limitation on the scope of the invention.

What we claim is:

Apparatus for the measurement and detection of leaks in a vacuum system comprising a pair of cold cathode magnetron ionization gauges, a probe gas filter, one of said gauges being adapted to be connected directly to the system under test and the other connected via said filter, means for setting up an alternating magnetic field axially of the cathode in each gauge so that the output of said gauges is in the form of pulses, and means for comparing the pulse output of the two gauges, said means comprising a rectifier coupled to the output of the gauge following the filter and producing a biasing voltage output, rectifying means connected to the output of the gauge connected directly to the system of the test, an indicator, the output of said rectifying means being applied to said indicator, and means for applying the biasing voltage to said rectifying means to control the flow of current to said indicator.

References Cited in the file of this patent
UNITED STATES PATENTS

| | | |
|---|---|---|
| 2,486,976 | Perret | Nov. 1, 1949 |
| 2,643,342 | Simpson | June 23, 1953 |
| 2,652,716 | Blears et al. | Sept. 22, 1953 |